US012658142B2

(12) United States Patent
Yuan et al.

(10) Patent No.: US 12,658,142 B2
(45) Date of Patent: Jun. 16, 2026

(54) DISPLAY SUBSTRATE, DRIVING METHOD THEREFOR, AND DISPLAY DEVICE

(71) Applicants: Hefei BOE Joint Technology Co., Ltd., Hefei (CN); BOE Technology Group Co., Ltd., Beijing (CN)

(72) Inventors: Can Yuan, Beijing (CN); Yongqian Li, Beijing (CN); Liu Wu, Beijing (CN); Zhidong Yuan, Beijing (CN)

(73) Assignees: HEFEI BOE JOINT TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/859,217

(22) PCT Filed: Jan. 17, 2024

(86) PCT No.: PCT/CN2024/072788

§ 371 (c)(1),
(2) Date: Oct. 23, 2024

(87) PCT Pub. No.: WO2024/179209

PCT Pub. Date: Sep. 6, 2024

(65) Prior Publication Data

US 2025/0279061 A1 Sep. 4, 2025

(30) Foreign Application Priority Data

Feb. 28, 2023 (CN) ........................ 202310195952.2

(51) Int. Cl.
*G09G 3/3266* (2016.01)

(52) U.S. Cl.
CPC ... *G09G 3/3266* (2013.01); *G09G 2300/0819* (2013.01); *G09G 2300/0842* (2013.01);
(Continued)

(58) Field of Classification Search
CPC ... G09G 2300/0819; G09G 2300/0842; G09G 2310/0286; G09G 2310/061;
(Continued)

(56) References Cited

U.S. PATENT DOCUMENTS

2015/0379912 A1* 12/2015 Wen ........................ G09G 3/003 377/64
2021/0358365 A1* 11/2021 Feng .................... G09G 3/3677
(Continued)

FOREIGN PATENT DOCUMENTS

| | | | |
|---|---|---|---|
| CN | 110428776 | A | 11/2019 |
| CN | 111292664 | A | 6/2020 |
| CN | 116312383 | A | 6/2023 |

*Primary Examiner* — Nitin Patel
*Assistant Examiner* — Amen W Bogale
(74) *Attorney, Agent, or Firm* — WHDA, LLP

(57) ABSTRACT

A display substrate, a driving method therefor and a display device are provided, the display substrate includes: a plurality of gate driving circuits, each of the gate driving circuits includes a plurality of shift registers that are cascaded with each other, each of the shift registers includes a first reset sub-circuit, the first reset sub-circuit is connected to an inter-frame reset control end, a reset signal end and a first to-be-reset node, respectively, and the first reset sub-circuit is configured to write a reset signal of the reset signal end into the first to-be-reset node according to an inter-frame reset control signal of the inter-frame reset control end; wherein the inter-frame reset control end is connected to an inter-frame reset control line, and inter-frame reset control ends of the plurality of gate driving circuits are connected to a same inter-frame reset control line.

15 Claims, 7 Drawing Sheets

(52) U.S. Cl.
CPC ............... *G09G 2310/0286* (2013.01); *G09G 2310/061* (2013.01); *G09G 2310/08* (2013.01)

(58) Field of Classification Search
CPC .... G09G 2310/08; G09G 3/20; G09G 3/3233; G09G 3/3266
See application file for complete search history.

(56) References Cited

U.S. PATENT DOCUMENTS

| | | | | |
|---|---|---|---|---|
| 2021/0358407 | A1* | 11/2021 | Xu | H10K 59/1216 |
| 2021/0366401 | A1* | 11/2021 | Feng | G11C 19/28 |
| 2022/0139324 | A1* | 5/2022 | Jeong | G09G 3/3275<br>345/204 |
| 2023/0094280 | A1* | 3/2023 | Lee | G09G 3/3233<br>345/691 |
| 2024/0161703 | A1* | 5/2024 | Zhu | G09G 3/3677 |

* cited by examiner

DISPLAY SUBSTRATE, DRIVING METHOD THEREFOR, AND DISPLAY DEVICE

CROSS-REFERENCES TO RELATED APPLICATIONS

The present application claims the priority of the Chinese patent application filed on Feb. 28, 2023 before the China National Intellectual Property Administration with the application number of 202310195952.2 entitled "DISPLAY SUBSTRATE, DRIVING METHOD THEREFOR, AND DISPLAY DEVICE", which is incorporated herein in its entirety by reference.

TECHNICAL FIELD

The present disclosure relates to the field of display technology and, more particularly, to a display substrate, a driving method therefor and a display device.

BACKGROUND

Organic light-emitting diodes (OLEDs) have advantages such as self-emission, wide viewing angles, fast response time, high luminous efficiency, low operating voltage, simple manufacturing processes and so on. They are hailed as the next generation "star" light-emitting devices.

SUMMARY

A display substrate is provided by the present application, wherein the display substrate includes: a plurality of gate driving circuits, each of the gate driving circuits includes a plurality of shift registers that are cascaded with each other, each of the shift registers includes a first reset sub-circuit, the first reset sub-circuit is connected to an inter-frame reset control end, a reset signal end and a first to-be-reset node, respectively, and the first reset sub-circuit is configured to write a reset signal of the reset signal end into the first to-be-reset node according to an inter-frame reset control signal of the inter-frame reset control end;

wherein the inter-frame reset control end is connected to an inter-frame reset control line, and inter-frame reset control ends of the plurality of gate driving circuits are connected to a same inter-frame reset control line.

In some embodiments, the inter-frame reset control line connecting the plurality of gate driving circuits is connected to a same signal input terminal.

In some embodiments, the inter-frame reset control line includes: a first extending line, a second extending line and a leading line, the first extending line is intersected with the second extending line, and the first extending line and the second extending line are connected to each other at an intersection position, one end of the leading line is connected to the second extending line, and the other end of the leading line is connected to the inter-frame reset control end.

In some embodiments, the inter-frame reset control line includes: two first extending lines, in an arranging direction of the plurality of shift registers located in a same gate driving circuit, one of the two first extending lines is located at one side of the plurality of gate driving circuits close to a signal input terminal, and the other is located at one side of the plurality of gate driving circuits away from the signal input terminal, wherein the signal input terminal is connected to the inter-frame reset control line.

In some embodiments, the first extending line and the second extending line are arranged in different layers, and are connected through a via hole at the intersection position.

In some embodiments, the display substrate further includes a first signal line, and the first signal line and the first extending line are arranged at different layers and are intersected with each other at a first position;

wherein at least one strip hole is disposed in the first extending line of the first position, and the at least one strip hole is configured to divide the first extending line of the first position into a plurality of extending segments that are connected in parallel with each other, extending directions of the extending segments are intersected with an extending direction of the first signal line.

In some embodiments, the extending directions of the extending segments are the same as the extending direction of the first extending line.

In some embodiments, in the extending direction of the first extending line, sizes of the extending segments are greater than a size of the first signal line.

In some embodiments, an extending direction of the first extending line is the same as an arranging direction of the plurality of gate driving circuits, and an extending direction of the second extending line is the same as an arranging direction of the plurality of shift registers located within a same gate driving circuit.

In some embodiments, the display substrate includes an active area and a border frame area located at at least one side of the active area, the inter-frame reset control line and the plurality of gate driving circuits are located in the border frame area; and the plurality of shift registers located within a same gate driving circuit are connected to a same second extending line through a plurality of leading lines, and the same second extending line is located at one side of the plurality of leading lines away from the active area.

In some embodiments, the display substrate further includes: a pixel circuit and a light emitting device, the pixel circuit is configured to drive the light emitting device to emit light;

wherein the plurality of gate driving circuits include at least one of:

a first gate driving circuit connected to a writing control end of the pixel circuit and configured to provide a writing control signal to the pixel circuit;

a second gate driving circuit connected to a compensating control end of the pixel circuit and configured to provide a compensating control signal to the pixel circuit; and a third gate driving circuit connected to an initialization control end of the pixel circuit and configured to provide an initialization control signal to the pixel circuit.

In some embodiments, each of the shift registers in the first gate driving circuit further includes a second reset sub-circuit, the second reset sub-circuit is connected to an inter-line reset control end, the reset signal end and a second to-be-reset node, respectively, and the second reset sub-circuit is configured to write the reset signal of the reset signal end into the second to-be-reset node according to an inter-line reset control signal of the inter-line reset control end;

wherein the inter-frame reset control line is further connected to the inter-line reset control end of a last level shift register in the first gate driving circuit.

In some embodiments, the display substrate includes a plurality of pixel circuits arranged in an array, and the plurality of pixel circuits form a plurality of pixel circuit rows;

wherein one shift register in the first gate driving circuit is connected to one of the pixel circuit rows, and one shift register in the second gate driving circuit is connected to one or more pixel circuit rows, and one shift register in the third gate driving circuit is connected to the one or more pixel circuit rows.

In some embodiments, the one shift register in the second gate driving circuit is connected to multiple pixel circuit rows, and the multiple pixel circuit rows are connected to different outputting transistors in the one shift register in the second gate driving circuit, gate electrodes of the outputting transistors connected to the multiple pixel circuit rows are connected to a same node; and the one shift register in the third gate driving circuit is connected to the multiple pixel circuit rows, and the multiple pixel circuit rows are connected to different outputting transistors in the one shift register in the third gate driving circuit, the gate electrodes of the outputting transistors connected to the multiple pixel circuit rows are connected to a same node.

In some embodiments, the pixel circuit includes:

a writing sub-circuit connected to the writing control end, a data end and a first node, and configured to write a data signal of the data end into the first node according to the writing control signal;

a compensating sub-circuit connected to the compensating control end, a reference voltage end and the first node, and configured to write a voltage of the reference voltage end into the first node according to the compensating control signal;

an initialization sub-circuit connected to the initialization control end, an initialization voltage end and a second node, and configured to write a voltage of the initialization voltage end into the second node according to the initialization control signal, wherein the second node is further connected to a first pole of the light emitting device;

a storage capacitor, wherein a first pole of the storage capacitor is connected to the first node, and a second pole of the storage capacitor is connected to the second node;

a driving sub-circuit connected to the first node, the second node and a third node, and configured to write a signal of the third node into the second node under potential control of the first node; and a light emitting sub-circuit connected to a light emitting control end, a first voltage end and the third node, and configured to cooperate with the driving sub-circuit according to a light emitting control signal of the light emitting control end to drive the light emitting device to emit the light.

A display device is provided by the present application, which includes:

the display substrate according to any one of the embodiments stated above; and a driving chip connected to the display substrate and configured to provide a driving signal to the display substrate.

A method for driving the display substrate is provided by the present application, which is configured to drive the display substrate according to any one of the embodiments stated above, the method includes:

between two frame periods, providing the inter-frame reset control signal to the inter-frame reset control line, so that the inter-frame reset control signal is input into the inter-frame reset control end through the inter-frame reset control line, the first reset sub-circuit writes the reset signal of the reset signal end into the first to-be-reset node according to the inter-frame reset control signal.

The above description is only a summary of technical schemes of the present disclosure, which can be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DETAILED DESCRIPTION

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
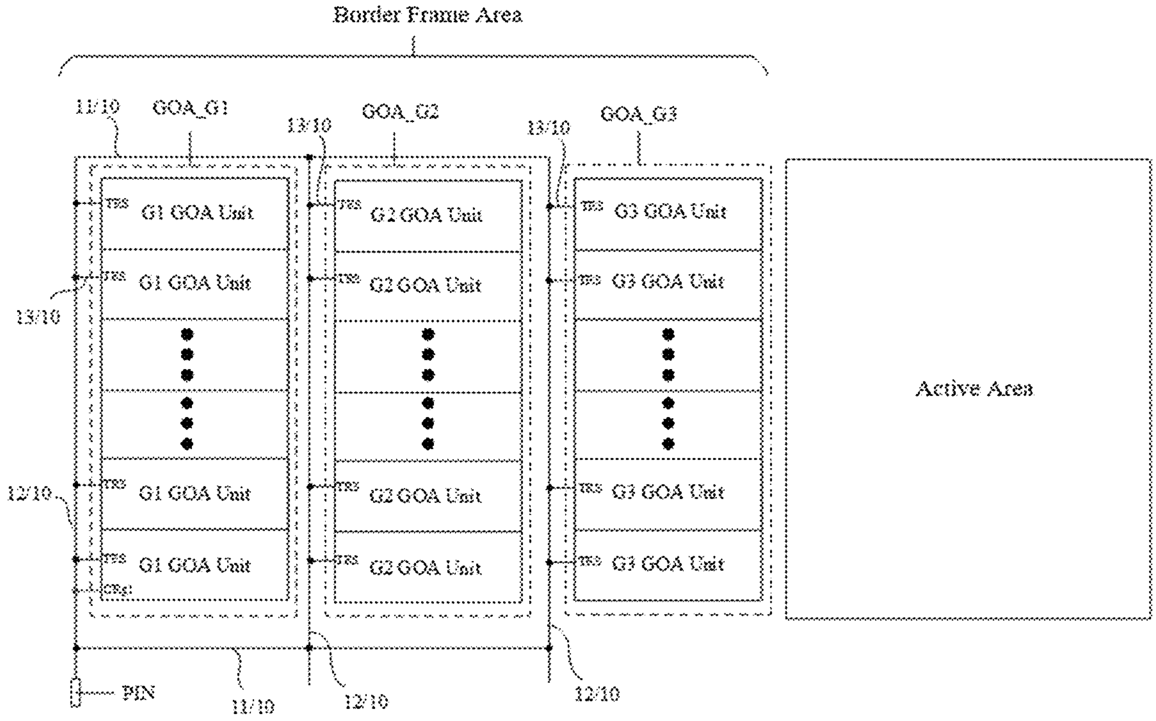
FIG. 1 exemplarily shows a schematic planar structural diagram of a display substrate according to the present application.

A display substrate is provided by the present application, referring to FIG. 1, which exemplarily shows a schematic planar structural diagram of a display substrate, the display substrate includes: a plurality of gate driving circuits GOA, each of the gate driving circuits GOA includes a plurality of shift registers that are cascaded with each other.

Exemplarily, as shown in FIG. 1, the display substrate includes three gate driving circuits GOA, which are a first gate driving circuit GOA_G1, a second gate driving circuit GOA_G2, and a third gate driving circuit GOA_G3. The first gate driving circuit GOA_G1 includes a plurality of first shift registers G1 GOA Unit that are cascaded with each other, and the second gate driving circuit GOA_G2 includes a plurality of second shift registers G2 GOA Unit that are cascaded with each other. The third gate driving circuit GOA_G3 includes a plurality of third shift registers G3 GOA Unit that are cascaded with each other.

Figure 2:
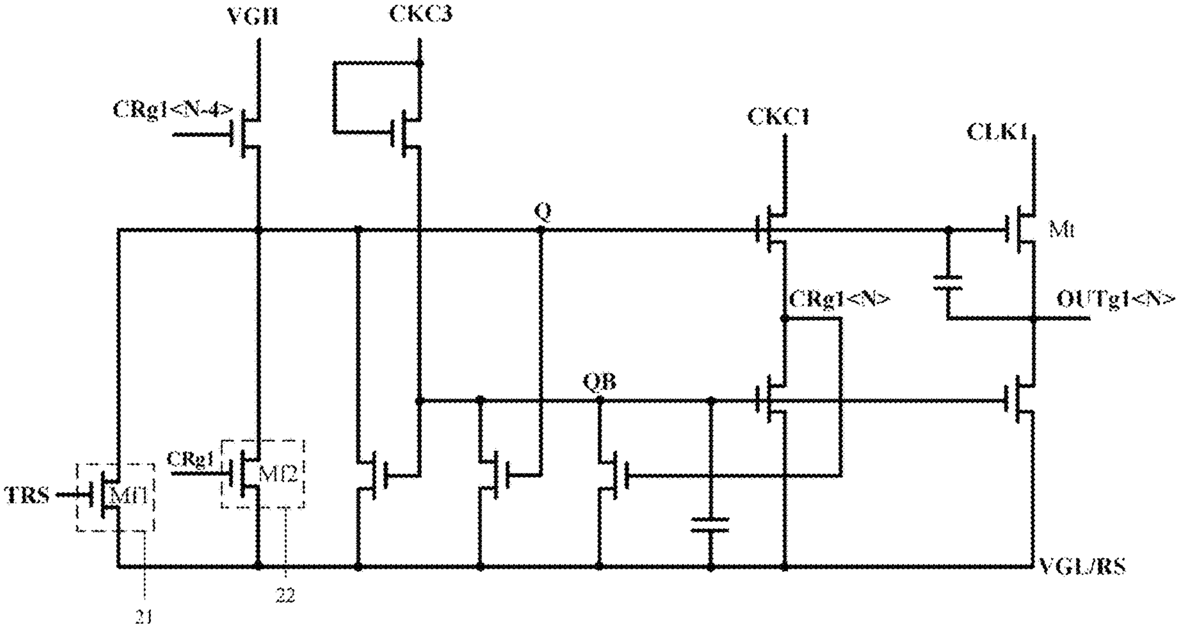
FIG. 2 exemplarily shows a schematic diagram of a circuit structure of a first shift register.
Figure 3:
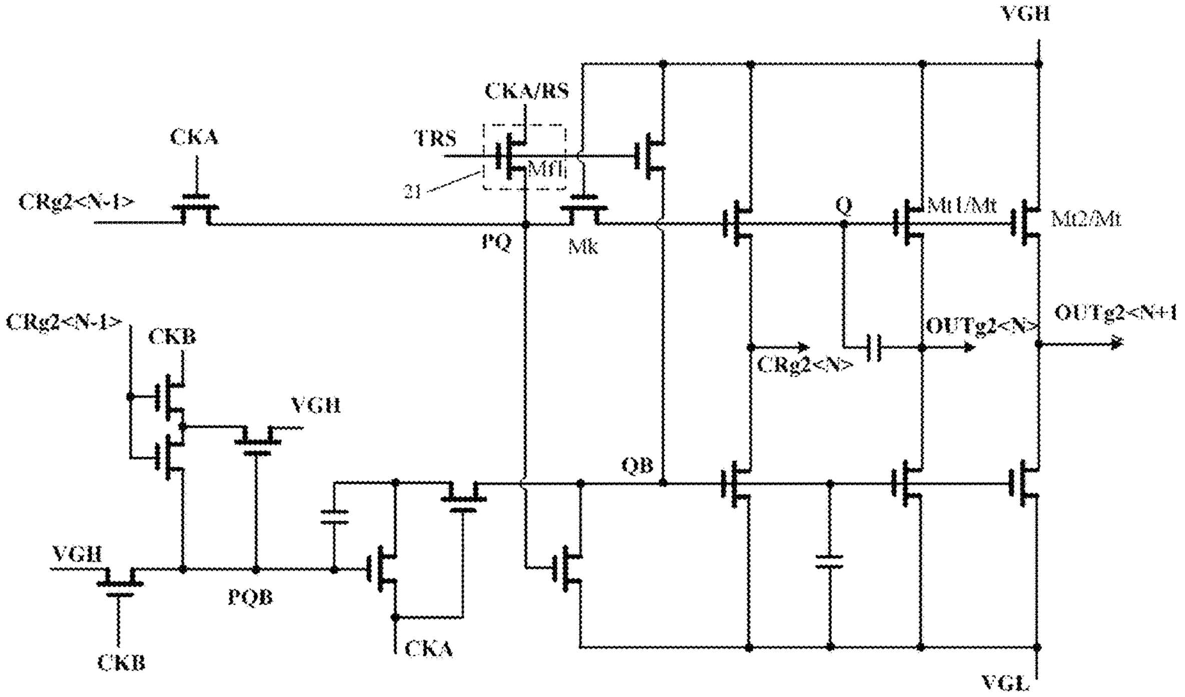
FIG. 3 exemplarily shows a schematic diagram of a circuit structure of a second shift register.
Figure 4:
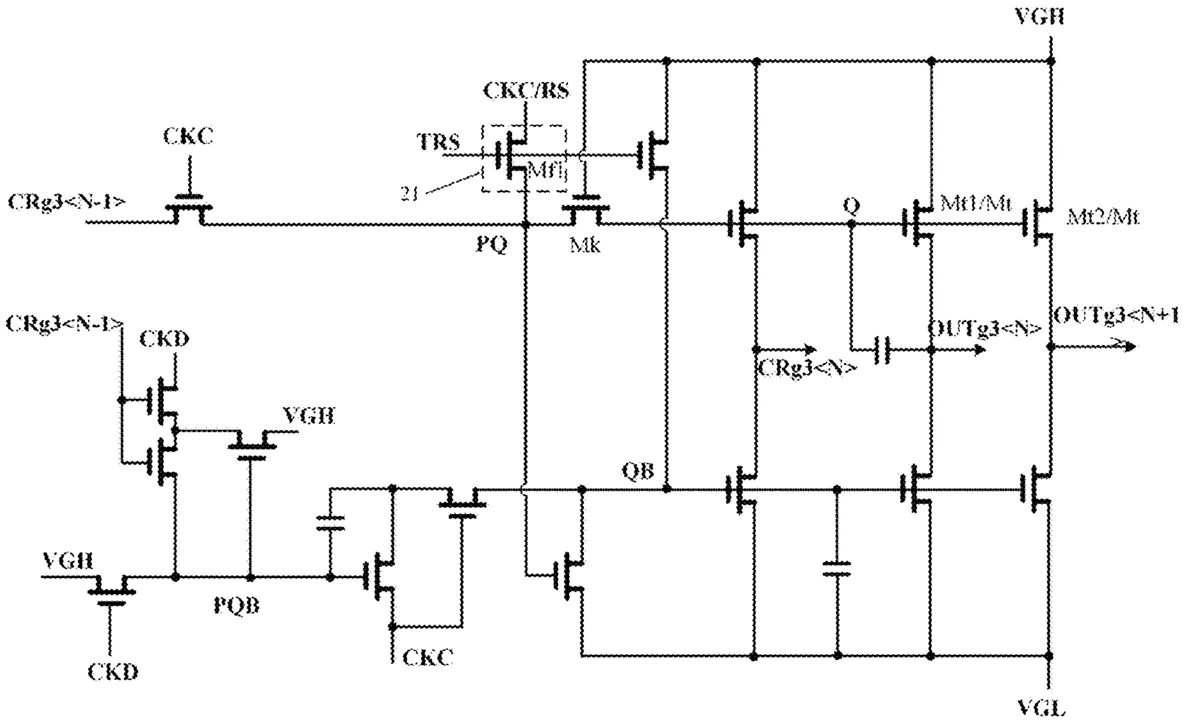
FIG. 4 exemplarily shows a schematic diagram of a circuit structure of a third shift register.

Referring to FIG. 2, a schematic diagram of a circuit structure of a first shift register is exemplarily shown. Referring to FIG. 3, a schematic diagram of a circuit structure of a second shift register is exemplarily shown. Referring to FIG. 4, a schematic diagram of a circuit structure of a third shift register is exemplarily shown.

Referring to any one of FIGS. 2 to 4, each of the shift registers includes a first reset sub-circuit 21, the first reset sub-circuit 21 is connected to an inter-frame reset control end TRS, a reset signal end RS and a first to-be-reset node, respectively, and the first reset sub-circuit 21 is configured to write a reset signal of the reset signal end RS into the first to-be-reset node according to an inter-frame reset control signal of the inter-frame reset control end TRS.

Exemplarily, as shown in any one of FIGS. 2 to 4, the first to-be-reset node may be a gate electrode of the outputting transistor Mt, or a node (such as a node Q) connected to the gate electrode of the outputting transistor Mt, which is not limited in the present application.

As shown in FIG. 1, the inter-frame reset control end TRS is connected to an inter-frame reset control line 10, and inter-frame reset control ends TRS of the plurality of gate driving circuits GOA are connected to a same inter-frame reset control line 10.

Exemplarily, as shown in FIG. 1, the inter-frame reset control end TRS of each first shift register G1 GOA Unit in the first gate driving circuit GOA_G1, the inter-frame reset control end TRS of each second shift register G2 GOA Unit in the second gate driving circuit GOA_G2, and the inter-frame reset control end TRS of each third shift register G3 GOA Unit in the third gate driving circuit GOA_G3 are connected to the same inter-frame reset control line 10.

In the practical implementation, an inter-frame reset control signal can be provided to the inter-frame reset control line 10 between two frame periods. The inter-frame reset control signals are input into the inter-frame reset control ends TRS of the shift registers in the plurality of gate driving circuits GOAs via the inter-frame reset control line 10. The first reset sub-circuit 21 in the shift register writes the reset signal of the reset signal end RS into the first to-be-reset node according to the inter-frame reset control signal input by the inter-frame reset control end TRS, thus the discharge and noise reduction of the first to-be-reset node may be performed, the anti-noise performance of the gate driving circuit GOA is enhanced, the functional stability of the gate driving circuit GOA is improved, and the normal display frame of display substrate is ensured.

According to the display substrate of the present application, by disposing that the inter-frame reset control ends TRS of the plurality of gate driving circuit GOA share a same inter-frame reset control line 10, while the anti-noise performance of the GOA can be improved, wring space is saved. Through reasonable designs, a quantity of Passlines or a quantity of channels on a driving chip can also be saved.

In some embodiments, the inter-frame reset control line 10 connecting the plurality of gate driving circuits GOA is connected to a same signal input terminal PIN. The signal input terminal PIN can be connected to the driving chip to provide the inter-frame reset control signal to the inter-frame reset control line 10.

As shown in FIG. 1, the inter-frame reset control line 10 connecting the first gate driving circuit GOA_G1 is connected to the inter-frame reset control ends TRS of the first shift registers G1 GOA Unit. The inter-frame reset control line 10 connecting the second gate driving circuit GOA_G2 is connected to the inter-frame reset control ends TRS of the second shift registers G2 GOA Unit. The inter-frame reset control line 10 connecting the third gate driving circuit GOA_G3 is connected to the inter-frame reset control ends TRS of the third shift registers G3 GOA unit. Wherein the inter-frame reset control line 10 connecting the first gate driving circuit GOA_G1, the inter-frame reset control line 10 connecting the second gate driving circuit GOA_G2 and the inter-frame reset control line 10 connecting the third gate driving circuit GOA_G3 are connected to the same signal input terminal PIN.

In the present application, since the plurality of gate driving circuits GOA share one signal input terminal PIN, the inter-frame reset control signal is provided to the inter-frame reset control line 10 through this signal input terminal PIN, the quantity of Passlines or the quantity of channels on the driving chip can be saved and the cost of the driving chip is reduced.

It should be noted that the inter-frame reset control line 10 connecting the plurality of gate driving circuits GOA can also be connected to a plurality of signal input terminals PIN, which is not limited in the application.

It should be noted that the first reset sub-circuit 21 and the first to-be-reset node can be directly connected, as shown in FIG. 2. The first reset sub-circuit 21 and the first to-be-reset node can also be indirectly connected, as shown in FIG. 3 or FIG. 4. A normally open transistor Mk is further disposed between the first reset sub-circuit 21 and the first to-be-reset node. A gate electrode of the normally open transistor Mk is connected to a signal end that enables the normally open transistor Mk to be switched on. A first pole of the normally open transistor Mk is connected to the first reset sub-circuit 21, and a second pole of the normally open transistor Mk is connected to the first to-be-reset node. Exemplarily, in FIG. 3 and FIG. 4, the normally open transistor Mk is an N-type transistor, and the gate electrode of the normally open transistor Mk is connected to the high-level signal VGH, so the normally open transistor Mk is in a switched-on state, thus the first reset sub-circuit 21 and the first to-be-reset node are switched on.

The time between the two frame periods specifically refers to the time after the plurality of gate driving circuits GOA complete their output in the previous frame period and before the plurality of gate driving circuits GOA start their output in the next frame period.

Figure 5:
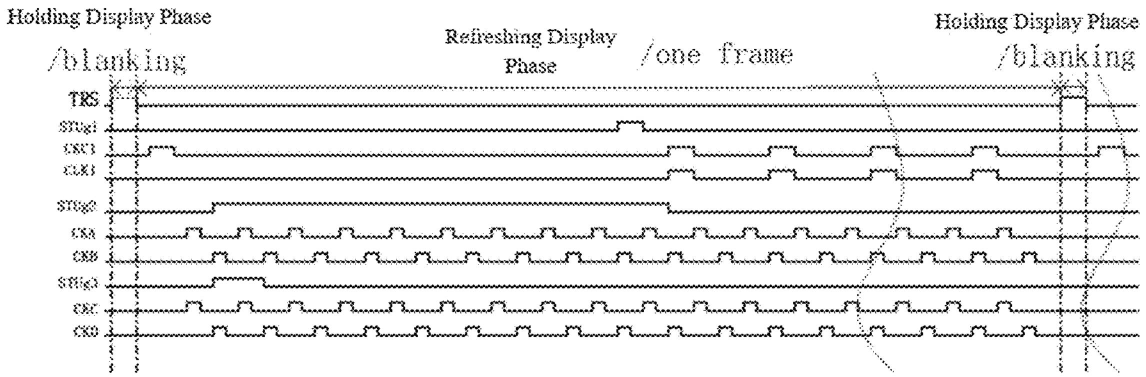
FIG. 5 exemplarily shows timing diagrams of several driving signals of the display substrate.

Exemplarily, as shown in FIG. 5, a display period of the display substrate includes a refreshing display phase (one frame shown in FIG. 5) and a holding display phase (i.e., the blanking phase). Wherein the time between two frame periods stated above can be the time between two refreshing display phases, that is, the time that is after the previous refreshing display phase, and before the next refreshing display phase, such as the holding display phase.

Exemplarily, as shown in any one of FIGS. 2 to 4, the first reset sub-circuit 21 may include a first reset transistor Mf1, a gate electrode of the first reset transistor Mf1 is connected to the inter-frame reset control end TRS, a first pole of the first reset transistor Mf1 is connected to the reset signal end RS, and a second pole of the first reset transistor Mf1 is connected to the first to-be-reset node.

In the specific implementation, between two frame periods, the inter-frame reset control signal provided to the signal input terminal PIN may be a signal that can switch on the first reset transistor Mf1. As shown in any one of FIGS. 2 to 4, when the first reset transistor Mf1 is an N-type transistor, a high-level inter-frame reset control signal (such as the TRS in FIG. 5) can be provided to the signal input terminal PIN between two frame periods.

In order to reset the first to-be-reset nodes in the plurality of gate driving circuit GOA at the same time, the type of the first reset transistor Mf1 in the first shift register G1 GOA Unit, the type of the first reset transistor Mf1 in the second shift register G2 GOA Unit, and the type of the first reset transistor Mf1 in the third shift register G3 GOA Unit are the same, for example, the first reset transistor Mf1 in the first shift register G1 GOA Unit, the first reset transistor Mf1 in the second shift register G2 GOA Unit and the first reset transistor Mf1 in the third shift register G3 GOA Unit are N-type transistors (as shown in FIG. 2 to FIG. 4) or P-type transistors.

The reset signal of the reset signal end RS can be a signal that can turn off the outputting transistor Mt. As shown in any one of FIGS. 2 to 4, when the outputting transistor Mt is an N-type transistor, between two frame periods, a low-level reset signal can be provided to the reset signal end RS.

Exemplarily, in the first shift register G1 GOA Unit, as shown in FIG. 2, the reset signal is a low-level signal VGL. In the second shift register G2 GOA Unit, as shown in FIG. 3, the reset signal is a clock signal CKA, as shown in FIG. 5, between two frame periods, the clock signal CKA is at a low level. In the third shift register G3 GOA Unit, as shown in FIG. 4, the reset signal is a clock signal CKC, as shown in FIG. 5, between two frame periods, the clock signal CKC is at a low level.

In some embodiments, as shown in FIG. 1, the inter-frame reset control line 10 includes: a first extending line 11, a second extending line 12 and a leading line 13, the first extending line 11 is intersected with the second extending line 12, and the first extending line 11 and the second extending line 12 are connected to each other at an intersection position, one end of the leading line 13 is connected to the second extending line 12, and the other end of the leading line 13 is connected to the inter-frame reset control end.

In some embodiments, as shown in FIG. 1, the inter-frame reset control line 10 includes two first extending lines 11, in an arranging direction (the vertical direction in FIG. 1) of the plurality of shift registers in a same gate driving circuit GOA, the two first extending lines 11 are located at two opposite sides (the upper side and the lower side as shown in FIG. 1) of the plurality of gate driving circuits GOA.

Exemplarily, as shown in FIG. 1, in the two first extending lines 11, in the arranging direction (the vertical direction in FIG. 1) of the plurality of shift registers located in the same gate driving circuit, one of the two first extending lines 11 is located at one side (that is the Source IN side, which is the lower side of the plurality of gate driving circuits GOA) of the plurality of gate driving circuits GOA close to a signal input terminal PIN, and the other is located at one side (that is the Source End side, which is the upper side of the plurality of gate driving circuits GOA) of the plurality of gate driving circuits GOA away from the signal input terminal PIN, wherein the signal input terminal PIN is connected to the inter-frame reset control line 10 to bind the driving chip and provide the inter-frame reset control signal to the inter-frame reset control line 10.

Figure 6:
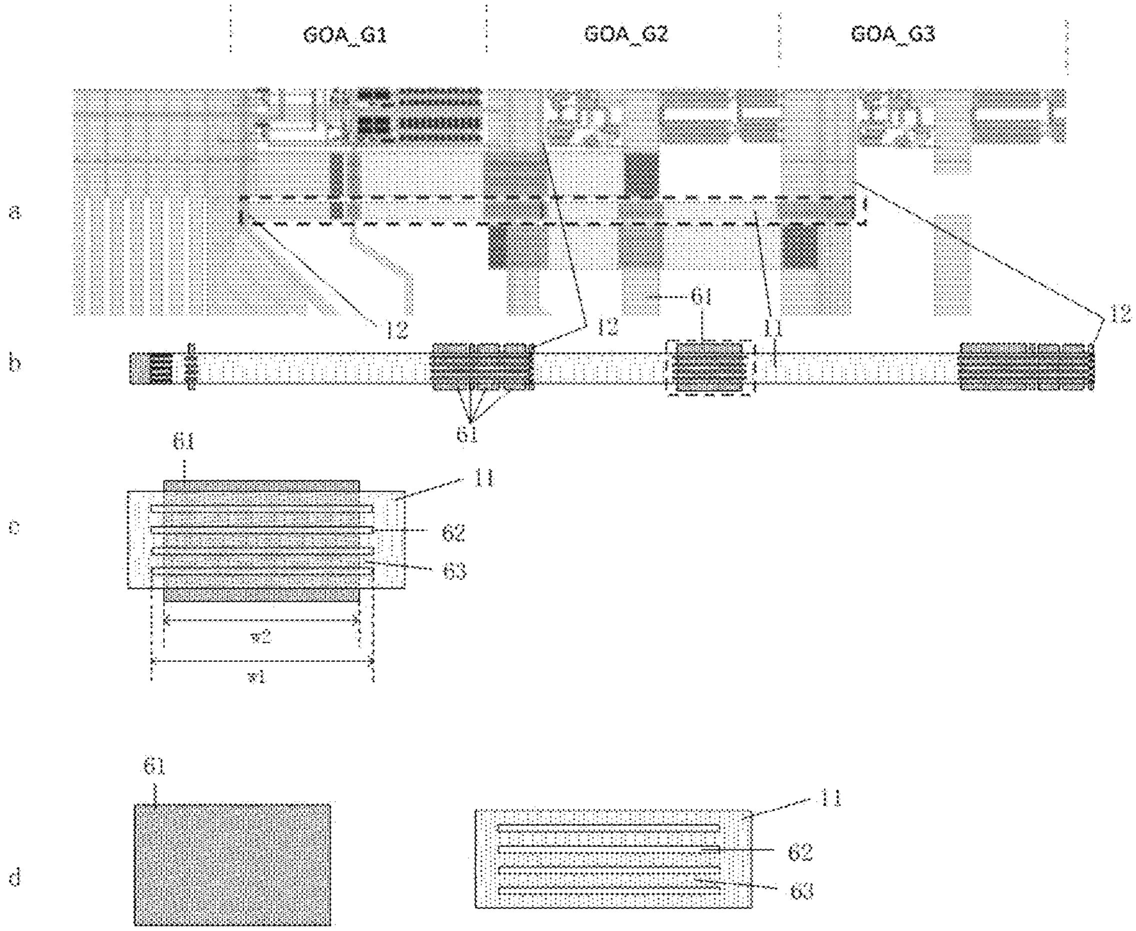
FIG. 6 exemplarily shows a wiring layout of the display substrate at the Source IN side.
Figure 7:
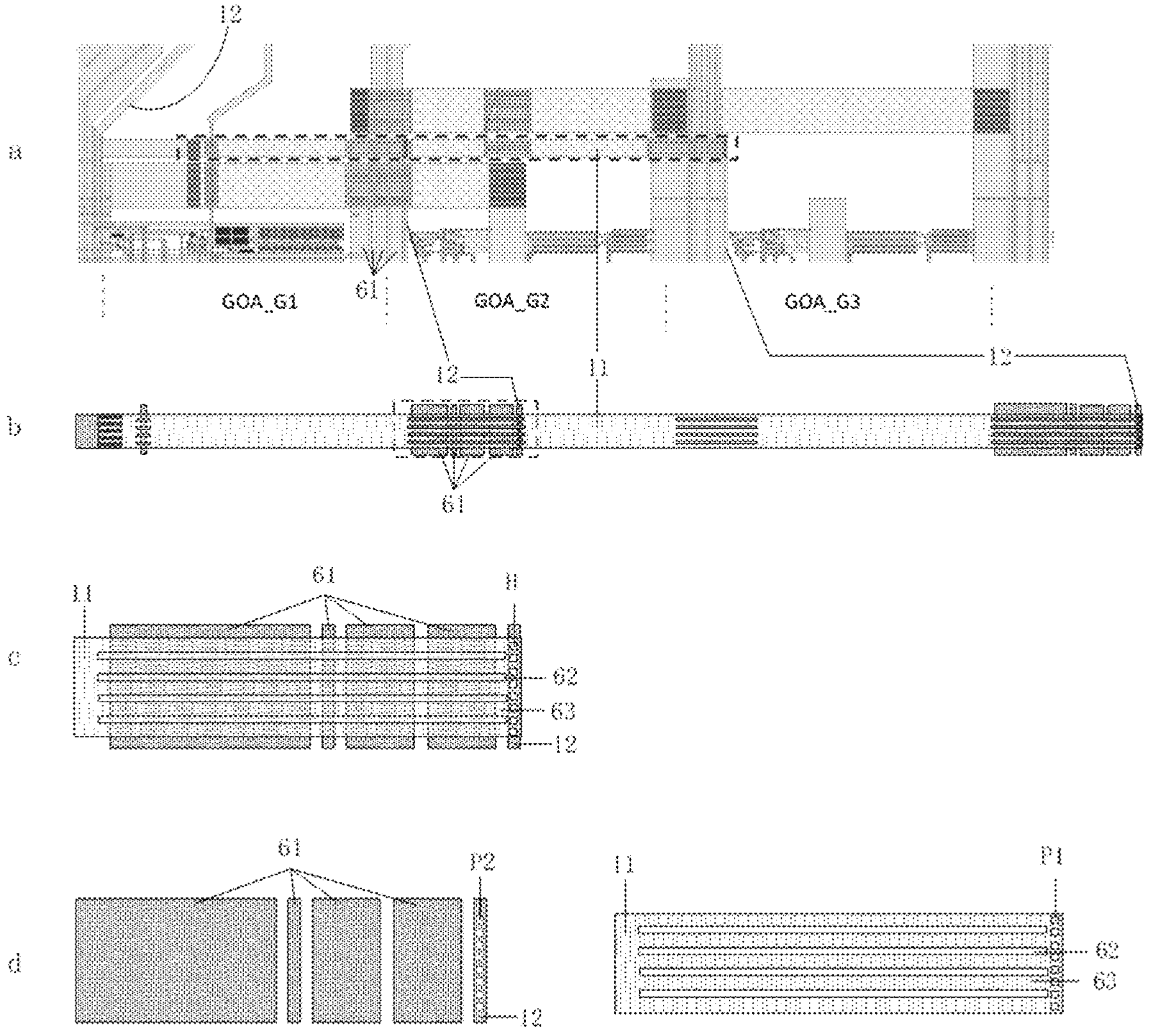
FIG. 7 exemplarily shows a wiring layout of the display substrate at the Source End side.

The wiring layouts of the display substrate at the Source IN side and the Source End side are exemplarily shown with reference to FIG. 6 and FIG. 7, respectively. In FIG. 6 and FIG. 7, FIG. b is the local enlargement view of the dotted box in FIG. a, FIG. c is the local enlargement view of the dotted box in FIG. b, and FIG. d is the hierarchical view corresponding to FIG. c. As shown in FIG. 6, there is a horizontal first extending line 11 disposed at the Source IN side of the display substrate. As shown in FIG. 7, there is another horizontal first extending line 11 disposed at the Source End side of the display substrate.

By disposing the plurality of first extending lines 11, the pressure drop of the inter-frame reset control signal on the inter-frame reset control line 10 can be reduced, and the driving capability of the inter-frame reset control signal can be improved.

It should be noted that the inter-frame reset control line 10 may also include a first extending line 11, for example, disposed at the side (such as the lower side of the plurality of gate driving circuits GOA) of the plurality of gate driving circuits GOA close to the signal input terminal PIN, or disposed at the side (such as the upper side of the plurality of gate driving circuits GOA) of the plurality of gate driving circuits GOA away from the side of the signal input terminal PIN. The inter-frame reset control line 10 can also include more than two first extending lines 11, some of the first extending lines 11 are located at the side (such as the lower side of the plurality of gate driving circuits GOA) of the plurality of gate driving circuits GOA close to the signal input terminal PIN. The other of the first extending lines are located at the side (such as the upper side of the plurality of gate driving circuits GOA) of the plurality of gate driving circuits GOA away from the signal input terminal PIN.

In some embodiments, as shown in FIG. 6 or FIG. 7, the first extending line 11 and the second extending line 12 are arranged in different layers, and are connected through a via hole (the via hole H as shown in FIG. c in FIG. 7) at the intersection position.

Exemplarily, as shown in FIG. d in FIG. 7, the transferring pattern P1 on the first extending line 11 and the transferring pattern P2 on the second extending line 12 are lapped via a through hole disposed in the insulating layer (not shown in the figures) between the first extending line 11 and the second extending line 12.

It should be noted that first extending line 11 and the second extending line 12 can also be arranged at a same layer, which is not limited in the present application. Similarly, the second extending line 12 and the leading line 13 can be arranged in the same layer or different layers, which is not limited in the present application.

In some embodiments, as shown in FIG. 6 or FIG. 7, the display substrate further includes a first signal line 61, and the first signal line 61 and the first extending line 11 are arranged at different layers and are intersected with each other at a first position; wherein at least one strip hole 62 is disposed in the first extending line 11 of the first position, and the at least one strip hole 62 is configured to divide the first extending line 11 of the first position into a plurality of extending segments 63 that are connected in parallel with each other, extending directions of the extending segments 63 are intersected with an extending direction of the first signal line 61.

By disposing that the strip holes 62 form the plurality of extending segments 63 that are connected in parallel with each other, it can be cut off when a certain extending segment 63 is short-circuited with the first signal line 61 to realize short-circuit repair, avoid short-circuit affecting the signal transmission on the first extending line 11, ensure the integrity of the signal, improve the yield of the product, and provide technical support for the MNT products with a medium or large size.

In some embodiments, as shown in FIG. 6 or FIG. 7, the extending directions of the extending segments 63 are the same as the extending direction of the first extending line 11. In FIG. 6 and FIG. 7, the extending directions of the extending segments 63 and the extending direction of the first extending line 11 are horizontal.

In some embodiments, as shown in FIG. 6, in the extending direction of the first extending line 11, the sizes w1 of the extending segments 63 are greater than the size w2 of the first signal line 61.

In some embodiments, as shown in FIG. 1, an extending direction of the first extending line 11 is the same as an arranging direction of the plurality of gate driving circuits GOA, and an extending direction of the second extending line 12 is the same as an arranging direction of the plurality of shift registers located within a same gate driving circuit.

As shown in FIG. 1, the arranging direction of the first gate driving circuit GOA_G1, the arranging direction of the second gate driving circuit GOA_G2 and the arranging direction of the third gate driving circuit GOA_G3 are horizontal, that is, the arranging directions of the plurality of gate driving circuit GOA are horizontal. The extending direction of the first extending line 11 is also horizontal. As shown in FIG. 1, the arranging direction of the plurality of shift registers in the same gate driving circuit GOA is vertical, and the extending direction of the second extending line 12 is also vertical. Wherein the extending direction of the first extending line 11 and the extending direction of the second extending line 12 can be perpendicular to each other (as shown in FIG. 1).

In some embodiments, as shown in FIG. 1, the display substrate includes an active area and a border frame area located at at least one side of the active area, the inter-frame reset control line 10 and the plurality of gate driving circuits GOA are located in the border frame area; wherein the plurality of shift registers located within a same gate driving circuit GOA are connected to a same second extending line 12 through a plurality of leading lines 13, and the same second extending line 12 is located at one side of the plurality of leading lines 13 away from the active area.

It should be noted that the interconnected inter-frame reset control line 10 and the plurality of gate driving circuits GOA can be disposed at a single side (such as the left side or the right side) of the active area, and the interconnected inter-frame reset control line 10 and the plurality of gate driving circuits GOA can be disposed at both sides (such as the left side and the right side) of the active area. Exemplarily, as shown in FIG. 1, the inter-frame reset control line 10 and the plurality of gate driving circuits GOA are located in the border frame area at the left side of the active area.

Figure 8:
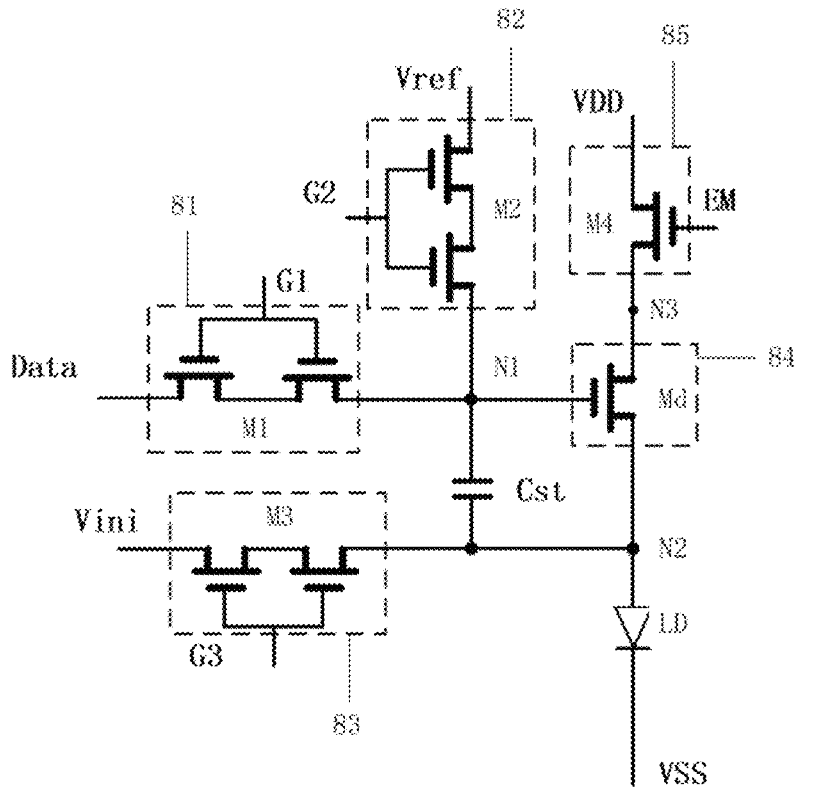
FIG. 8 exemplarily shows a schematic structural diagram of a pixel circuit.

In some embodiments, the active area of the display substrate includes a pixel circuit and a light emitting device, and the pixel circuit is configured to drive the light emitting device to emit light. Exemplarily, as shown in FIG. 8, the pixel circuit includes: a writing sub-circuit 81, a compensating sub-circuit 82, an initialization sub-circuit 83, a storage capacitor Cst, a driving sub-circuit 84 and a light emitting sub-circuit 85. Wherein the writing sub-circuit 81 is connected to the writing control end G1, a data end Data and a first node N1, and configured to write a data signal of the data end Data into the first node N1 according to the writing control signal of the writing control end G1; the compensating sub-circuit 82 is connected to the compensating control end G2, a reference voltage end Vref and the first node N1, and configured to write a reference voltage of the reference voltage end Vref into the first node N1 according to the compensating control signal of the compensating control end G2; the initialization sub-circuit 83 is connected to the initialization control end G3, an initialization voltage end Vini and a second node N2, and configured to write an initialization voltage of the initialization voltage end Vini into the second node N2 according to the initialization control signal of the initialization control end G3, wherein the second node N2 is further connected to a first pole of the light emitting device LD; a first pole of the storage capacitor Cst is connected to the first node N1, and a second pole of the storage capacitor Cst is connected to the second node N2; the driving sub-circuit 84 is connected to the first node N1, the second node N2 and a third node N3, and configured to write a signal of the third node N3 into the second node N2 under potential control of the first node N1; and the light emitting sub-circuit 85 is connected to a light emitting control end EM, a first voltage end VDD and the third node N3, and configured to cooperate with the driving sub-circuit 84 according to a light emitting control signal of the light emitting control end EM to drive the light emitting device LD to emit the light.

Exemplarily, as shown in FIG. 8, the writing sub-circuit 81 includes a first transistor M1, a gate electrode of the first transistor M1 is connected to the writing control end G1, a first pole of the first transistor M1 is connected to the data end Data, and a second pole of the first transistor M1 is connected to the first node N1.

Exemplarily, as shown in FIG. 8, the compensating sub-circuit 82 includes a second transistor M2, a gate electrode of the second transistor M2 is connected to the compensating control end G2, a first pole of the second transistor M2 is connected to the reference voltage end Vref, and the second pole of the second transistor M2 is connected to the first node N1.

Exemplarily, as shown in FIG. 8, the initialization sub-circuit 83 includes a third transistor M3, a gate electrode of the third transistor M3 is connected to the initialization control end G3, a first pole of the third transistor M3 is connected to the initialization voltage end *Vini*, and the second pole of the third transistor M3 is connected to the second node N2.

Exemplarily, as shown in FIG. 8, the driving sub-circuit 84 includes a driving transistor Md, a gate electrode of the driving transistor Md is connected to the first node N1, the first pole of the driving transistor Md is connected to the second node N2, and the second pole of the driving transistor Md is connected to the third node N3.

Exemplarily, as shown in FIG. 8, the light emitting sub-circuit 85 includes a fourth transistor M4, a gate electrode of the fourth transistor M4 is connected to the light emitting control end EM, a first pole of the fourth transistor M4 is connected to the first voltage end VDD, and the second pole of the fourth transistor M4 is connected to the third node N3.

Figure 9:
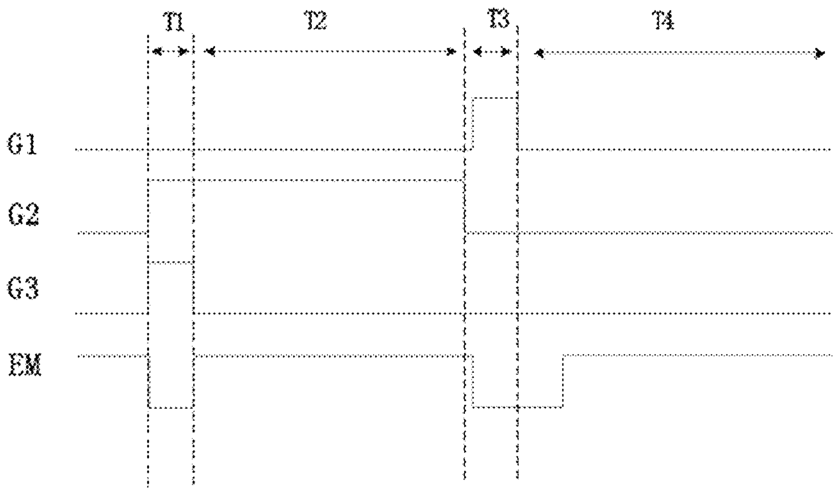
FIG. 9 exemplarily shows timing diagrams of several control signals of a pixel circuit.

Exemplarily, the transistors in the pixel circuit shown in FIG. 8 are all N-type transistors. With reference to FIG. 9, the timing diagrams of several control signals of the pixel circuit shown in FIG. 8 are shown. Wherein G1 represents the writing control signal of the writing control end G1, and G2 represents the compensating control signal of the compensating control end G2. G3 represents the initialization control signal of the initialization control end G3, and EM represents the light emitting control signal of the light emitting control end EM. As shown in FIG. 9, the driving process of the pixel circuit may include the following four stages:

The stage T1 is the reset stage, the writing control signal G1 is at a low level, the compensating control signal G2 and the initialization control signal G3 are at a high level, the light emitting control signal EM is at a low level, so the second transistor M2 is turned on, the third transistor M3 is turned on, the fourth transistor M4 is turned off, the second node N2, that is the LD anode, is reset to the initialization voltage Vini; the reference voltage Vref is written into the first node N1, that is the gate electrode of the driving transistor Md, and the first transistor M1 is turned off.

The stage T2 is a compensation stage, the writing control signal G1 is at a low level, the compensating control signal G2 is at a high level, the initialization control signal G3 is at a low level, and the light emitting control signal EM is at a high level. Therefore, the third transistor M3 is turned off, the fourth transistor M4 is turned on, the second transistor M2 is continuously turned on, and the first transistor M1 is turned off. Since the driving transistor Md is in a turned-on state at this moment, the source voltage VG of the driving transistor Md is raised to VGS=Vth, and the driving transistor Md is turned off. Wherein the VGS is the difference between the source voltage VG of the driving the transistor Md and the gate electrode voltage VS of the driving the transistor Md.

The stage T3 is a writing stage. The writing control signal G1 is at a high level, the compensating control signal G2 is at a low level, the initialization control signal G3 is at a low level, and the light emitting control signal EM is at a low level. Therefore, the second transistor M2 is turned off, the third transistor M3 is turned off, the fourth transistor M4 is turned off, and the first transistor M1 is turned on to write a data voltage Data.

The stage T4 is a light-emitting stage, the writing control signal G1 is at a low level, the compensating control signal G2 is at a low level, the initialization control signal G3 is at a low level, and the light emitting control signal EM is at a high level. Therefore, the fourth transistor M4 is turned on, the first transistor M1, the second transistor M2 and the third transistor M3 are turned off.

It should be noted that the transistors in the pixel circuit can be oxide transistors, can also be polycrystalline silicon transistors, and can also be oxide transistors and polycrystalline silicon transistors connected in series with each other (such as the first transistor M1, the second transistor M2 and the third transistor M3 shown in FIG. 8).

In some embodiments, the plurality of gate driving circuits GOA sharing the inter-frame reset control line 10 include a first gate driving circuit GOA_G1, the first gate driving circuit GOA_G1 is connected to the writing control end G1 of the pixel circuit and configured to provide a writing control signal to the pixel circuit.

In some embodiments, the plurality of gate driving circuits GOA sharing the inter-frame reset control line 10 include a second gate driving circuit GOA_G2, the second gate driving circuit GOA_G2 is connected to the compensating control end G2 of the pixel circuit and configured to provide the compensating control signal to the pixel circuit.

In some embodiments, the plurality of gate driving circuits GOA sharing the inter-frame reset control line 10 include a third gate driving circuit GOA_G3, the third gate driving circuit GOA_G3 is connected to the initialization control end G3 of the pixel circuit and configured to provide an initialization control signal to the pixel circuit.

Figure 10:
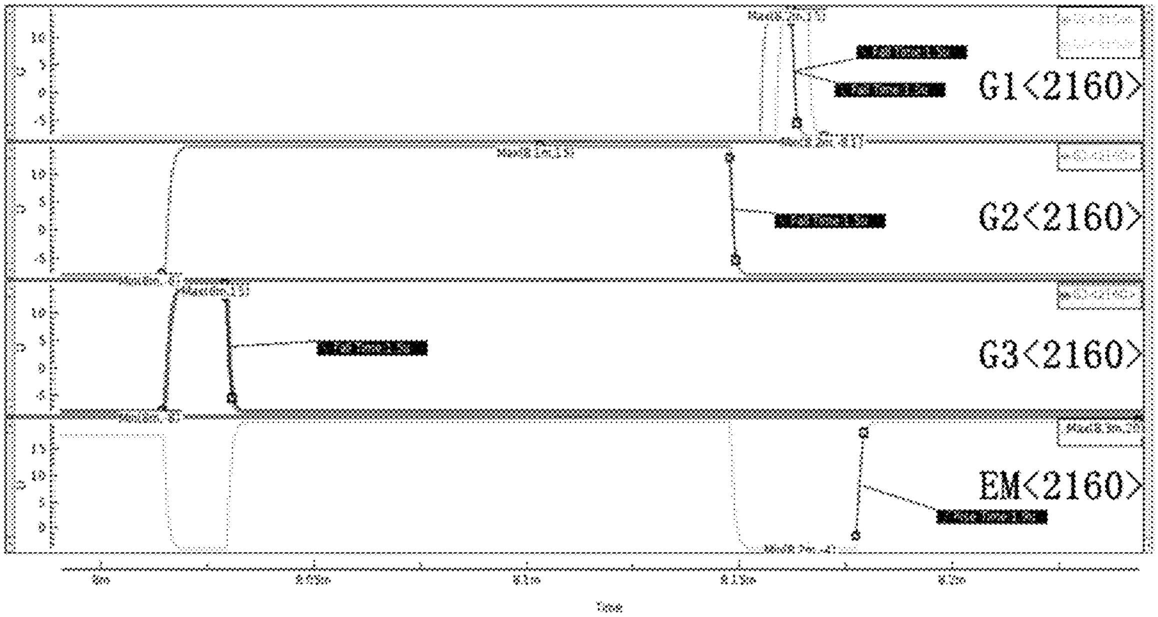
FIG. 10 exemplarily shows simulation results of several signals in the display substrate according to the present application.

With reference to FIG. 10, the simulation results of several signals in the display substrate according to the present application are exemplarily shown. As shown in FIG. 10, the first gate driving circuit GOA_G1 outputs the writing control signal G1<2160> to the pixel circuit in the 2160th row, and the second gate driving circuit GOA_G2 outputs the compensating control signal G2<2160> to the pixel circuit in the 2160th row, and the third gate driving circuit GOA_G3 outputs the initialization control signal G3<2160> to the pixel circuit in the 2160th row, from the simulation results, it can be seen that the signal integrity is good and has stronger anti-interference ability. The EM<2160> in FIG. 10 is the light emitting control signal of the pixel circuit in the 2160th row.

In some embodiments, as shown in FIG. 2, the shift register in the first gate driving circuit GOA_G1 further includes a second reset sub-circuit 22, the second reset sub-circuit 22 is connected to an inter-line reset control end CRg1, the reset signal end RS and a second to-be-reset node, respectively, and the second reset sub-circuit 22 is configured to write the reset signal of the reset signal end RS into the second to-be-reset node according to an inter-line reset control signal of the inter-line reset control end CRg1. Wherein the inter-frame reset control line 10 is further connected to the inter-line reset control end CRg1 of a last level shift register in the first gate driving circuit GOA_G1.

Exemplarily, as shown in FIG. 2, the second to-be-reset node can be the gate electrode of the outputting transistor Mt, or a node (such as node Q) connected to the gate electrode of the outputting transistor Mt, which is not limited in the present application.

In the first gate driving circuit GOA_G1, regarding the shift registers except for the last level shift register, the output end of the lower-level shift register is connected to the inter-line reset control end CRg1 of the upper-level shift register, so as to reset the upper-level shift register. That is, in the first gate driving circuit GOA_G1, the inter-line reset control end CRg1 of the N-level shift register is connected to the output end of the (N+M)-level shift register, wherein $1 \le N < H$, $N+M \le H$, $M \ge 1$, M and N are positive integers, and H is the total number of shift registers in the first gate driving circuit GOA_G1. For example, M may be 1, 2, 3 or 4 and so on.

As shown in FIG. 1, the inter-line reset control end CRg1 of the last level shift register in the first gate driving circuit GOA_G1 is connected to the inter-frame reset control line 10, that is, the inter-frame reset control signal is multiplexed as the inter-line reset control signal. In the specific implementation, the inter-frame reset control signal may be provided to the inter-frame reset control line 10 between two frame periods (such as the blanking period). The inter-frame reset control signal is input into the inter-line reset control end CRg1 of the last level shift register in the first gate driving circuit GOA_G1 through the inter-frame reset control line 10. The second reset sub-circuit 22 writes the reset signal of the reset signal end RS into the second to-be-reset node according to the inter-frame reset control signal, so that the second to-be-reset node can be reset.

In this way, while the first to-be-reset node in the plurality of gate driving circuits GOA is reset by using the inter-frame reset control signal, the second to-be-reset node of the last level shift register of the first gate driving circuit GOA_G1 can be reset. By connecting the inter-frame reset control line 10 to the inter-line reset control end CRg1 of the last level shift register in the first gate driving circuit GOA_G1, there is no need to set an additional inter-line reset control line to connect to the above last level shift register, thus the wiring space can be saved and the design and drive difficulty are simplified.

Exemplarily, as shown in FIG. 2, the second reset sub-circuit 22 can include the second reset transistor Mf2, a gate electrode of the second reset transistor Mf2 is connected to the inter-line reset control end CRg1, a first pole of the second reset transistor Mf2 is connected to the reset signal end RS, and a second pole of the second reset transistor Mf2 is connected to the second to-be-reset node.

In the specific implementation, the inter-frame reset control signal provided to the signal input terminal PIN can be a signal that can turn on the second reset transistor Mf2 between two frame periods. As shown in FIG. 2, when the second reset transistor Mf2 is an N-type transistor, a high-level inter-frame reset control signal (for example, the TRS shown in FIG. 5) can be provided to the signal input terminal PIN between two frame periods.

In order for the inter-frame reset control signal to be multiplexed as the inter-line reset control signal, the type of the first reset transistor Mf1 and the type of the second reset transistor Mf2 are the same, for example, both the type of the first reset transistor Mf1 and the type of the second reset transistor Mf2 are N-type transistors or P-type transistors.

In some embodiments, as shown in FIGS. 2 to 4, the display substrate includes the plurality of pixel circuits arranged in an array, and the plurality of pixel circuits form the plurality of pixel circuit rows. Wherein one shift register in the first gate driving circuit GOA_G1 is connected to one of the pixel circuit rows, and one shift register in the second gate driving circuit GOA_G2 is connected to one or more pixel circuit rows, and one shift register in the third gate driving circuit GOA_G3 is connected to the one or more pixel circuit rows.

Exemplarily, as shown in FIG. 2, one shift register in the first gate driving circuit GOA_G1 is connected to one pixel circuit row. For example, the output end OUTg1<N> of the shift register is connected to the pixel circuit in an Nth row (i.e., the Nth pixel circuit row). In FIG. 2, the output end OUTg1<N> of the shift register is connected to the first pole of the outputting transistor Mt or the second pole of the outputting transistor Mt.

Exemplarily, as shown in FIG. 3, one shift register in the second gate driving circuit GOA_G2 is connected to two pixel circuit rows. For example, one output end OUTg2<N> of the shift register is connected to the pixel circuit in the Nth row (i.e., the Nth pixel circuit row); the other output end OUTg2<N+1> is connected to the pixel circuit in the (N+1)th row (i.e., the (N+1)th pixel circuit row). In FIG. 3, the output end OUTg2<N> is connected to the first pole of the outputting transistor Mt1 or the second pole of the outputting transistor Mt1, and the output end OUTg2<N+1> is connected to the first pole of the outputting transistor Mt2 or the second pole of the outputting transistor Mt2.

Exemplarily, as shown in FIG. 4, one shift register in the third gate driving circuit GOA_G3 is connected to two pixel circuit rows, for example, one output end OUTg3<N> of the shift register in FIG. 4 is connected to the pixel circuit in the Nth row (i.e., the Nth pixel circuit row); the other output end OUTg3<N+1> is connected to the pixel circuit in the (N+1)th row (i.e., the (N+1)th pixel circuit row). In FIG. 4, the output end OUTg3<N> is connected to the first pole of the outputting transistor Mt1 or the second pole of the outputting transistor Mt1, and the output end OUTg3<N+1> is connected to the first pole of the outputting transistor Mt2 or the second pole of the outputting transistor Mt2.

In some embodiments, as shown in FIG. 3, one shift register in the second gate driving circuit GOA_G2 is connected to multiple pixel circuit rows, and the multiple pixel circuit rows are connected to different outputting transistors Mt in the shift register; the gate electrodes of the outputting transistors Mt connected to the multiple pixel circuit rows are connected to a same node. In this way, one outputting transistor Mt is connected to a corresponding pixel circuit row, compared with the scheme that one outputting transistor Mt is connected to the plurality of pixel circuit rows, the size of the outputting transistor Mt in the second gate driving circuit GOA_G2 can be reduced and the effect of the parasitic capacitance on the outputting transistor Mt is reduced.

Exemplarily, as shown in FIG. 3, one shift register in the second gate driving circuit GOA_G2 is connected to two pixel circuit rows (i.e., the Nth pixel circuit row and the (N+1)th pixel circuit row). Two pixel row circuits are connected to the outputting transistor Mt1 and the outputting transistor Mt2, respectively. The gate electrode of the outputting transistor Mt1 and the gate electrode of the outputting transistor Mt2 are connected to a same node Q.

In some embodiments, as shown in FIG. 4, one shift register in the third gate driving circuit GOA_G3 is connected to the multiple pixel circuit rows, and the multiple pixel circuit rows are connected to different outputting transistors Mt in the shift register. The gate electrodes of the plurality of outputting transistors Mt connected to the multiple pixel circuit rows are connected to a same node. In this way, an outputting transistor Mt is connected to a corresponding pixel circuit row, compared with the scheme that one outputting transistor Mt is connected to the plurality of pixel circuit rows, the size of the outputting transistor Mt in the third gate driving circuit GOA_G3 can be reduced and the effect of the parasitic capacitance on the outputting transistor Mt is reduced.

Exemplarily, as shown in FIG. 4, one shift register in the third gate driving circuit GOA_G3 is connected to two pixel circuit rows (i.e., the Nth pixel circuit row and the (N+1)th pixel circuit row). The two pixel circuit rows are connected to the outputting transistor Mt1 and the outputting transistor Mt2, respectively. The gate electrodes of the outputting transistor Mt1 and the gate electrode of the outputting transistor Mt2 are connected to a same node Q.

A display device is also provided by the present application, which includes: the display substrate according to any one of embodiments stated above; and a driving chip connected to the display substrate to provide a driving signal to the display substrate.

Understandably, the display device provided in the present application has the advantages of the display substrate stated above, which will not be repeated here. The display device provided in the present application can be: a display panel, a mobile phone, a tablet computer, a television, a displayer, a laptop, a digital photo frame or a navigator and any other products or components with a display function.

In the specific implementation, the driving chip can be connected to the signal input terminal in the display substrate.

A method for driving the display substrate is further provided by the present application, configured to drive the display substrate according to any one of embodiments stated above, the method includes:

between two frame periods, providing the inter-frame reset control signal to the inter-frame reset control line 10, so that the inter-frame reset control signal is input into the inter-frame reset control end TRS through the inter-frame reset control line 10, the first reset sub-circuit 21 writes the reset signal of the reset signal end RS into the first to-be-reset node according to the inter-frame reset control signal.

It should be noted that the method for driving the display substrate may include additional steps, which can be determined based on actual needs, which is not limited in the present disclosure. For detailed explanations and technical effects of the driving method, the descriptions of the display substrate mentioned above can be referred to, which will not be repeated here.

In the present disclosure, the meaning of "a plurality of" is two or more, and the meaning of "at least one" is one or more, unless otherwise specifically defined.

In the present disclosure, an orientation or positional relationship indicated by the terms "upper" and "lower" is based on orientation or positional relationships shown in the drawings, and are merely for convenience of describing the present disclosure and simplifying the description, rather than indicate or imply that the device or element referred to must have a specific orientation, be configured and operated in a specific orientation, and thus cannot be understood as a limitation on the present disclosure.

In the present text, the terms "include", "contain" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The "one embodiment", "some embodiments", "exemplary embodiments", "one or more embodiments", "example", "one example" or "some examples" as used herein are intended to indicate that specific features, structures, materials or characteristics related to the embodiment or example are included in at least one embodiment or example of the present disclosure. The illustrative indication of the above terms does not necessarily refer to the same one embodiment or example. Moreover, the specific features, structures, materials or characteristics may be included in any one or more embodiments or examples in any suitable manner.

In the present text, relation terms such as first and second are merely intended to distinguish one entity or operation from another entity or operation, and that does not necessarily require or imply that those entities or operations have therebetween any such actual relation or order.

In the description on some embodiments, "couple" and "connect" may be used. For example, in the description on some embodiments, the term "connect" may be used to indicate that two or more components directly physically contact or electrically contact each other. As another example, in the description on some embodiments, the term "couple" may be used to indicate that two or more components directly physically contact or electrically contact each other. However, the term "couple" or "communicatively couple" may also indicate that two or more components do not directly contact each other, but still cooperate with each other or act on each other. The embodiments disclosed herein are not necessarily limited by the contents herein.

"At least one of A, B and C" and "at least one of A, B or C" have the same meaning, and both of them include the following combinations of A, B and C: solely A, solely B, solely C, the combination of A and B, the combination of A and C, the combination of B and C, and the combination of A, B and C.

"A and/or B" include the following three combinations: solely A, solely B, and the combination of A and B.

As used herein, with reference to the context, the term "if" is optionally interpreted as meaning "when" or "in response to determining that" or "in response to detecting that". Similarly, with reference to the context, the phrase "if it has been determined that" or "if the stated condition or event has been detected" is optionally interpreted as referring to "when it has been determined that" or "in response to determining . . . " or "when the stated condition or event has been detected" or "in response to the stated condition or event having been detected".

The "for" or "configured for" as used herein is intended as opened and inclusive languages, and does not exclude apparatuses adapted for or configured for executing additional tasks or steps.

The "based on" or "according to" as used herein means opening and inclusive. The processes, steps, calculations or other actions based on one or more conditions or values may be based on other conditions or exceed the values in practice. The processes, steps, calculations or other actions according to one or more conditions or values may be according to other conditions or exceed the values in practice.

As used herein, "about", "substantially" or "approximately" includes the described value and the average value within an acceptable deviation range of the particular value, wherein the acceptable deviation range is decided by the discussed measurement that a person skilled in the art has taken into consideration and the error relevant to the measurement on the specific quantity (i.e., the limitation of the measuring system).

As used herein, "parallel", "perpendicular", "equal" and "flushing" include the described case and cases similar to the described case, wherein the range of the similar cases is within an acceptable deviation range, wherein the acceptable deviation range is decided by the discussed measurement that a person skilled in the art has taken into consideration and the error relevant to the measurement on the specific quantity (i.e., the limitation of the measuring system). For example, "parallel" includes absolute parallelism and approximate parallelism, wherein the acceptable deviation range of the approximate parallelism may, for example, be deviations within 5°. "Perpendicular" includes absolute perpendicularity and approximate perpendicularity, wherein the acceptable deviation range of the approximate perpendicularity may also, for example, be deviations within 5°. "Equal" includes absolute equality and approximate equality, wherein the acceptable deviation range of the approximate equality may, for example, be that the difference between the two equal instances is less than or equal to 5% of any one of them. "Flushing" includes absolute flushing and approximate flushing, wherein the acceptable deviation range of the approximate flushing may, for example, be that the distance between the two flushing instances is less than or equal to 5% of the dimension of any one of them.

It should be understood that, when a layer or element is described as on another layer or a base board, the layer or element may be directly on another layer or the base board, or an intermediate layer may also exist between the layer or element and another layer or the base board.

The exemplary embodiments are described herein with reference to sectional views and/or plan views as idealized illustrative figures. In the drawings, in order for clarity, the thicknesses of the layers and the regions are exaggerated. Therefore, alterations from the shapes of the figures as the result of, for example, fabricating techniques and/or tolerances can be envisaged. Therefore, the exemplary embodiments should not be interpreted as limited to the shapes of the regions shown herein, but should include the shape deviations caused by, for example, fabrication. For example, an etching region illustrated as rectangular generally has a curved feature. Therefore, the regions shown in the drawings are essentially illustrative, and their shapes are not intended to illustrate the practical shapes of the regions of the device, and are not intended to limit the scopes of the exemplary embodiments.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A display substrate, wherein the display substrate comprises: a plurality of gate driving circuits, each of the gate driving circuits comprises a plurality of shift registers that are cascaded with each other, each of the shift registers comprises a first reset sub-circuit, the first reset sub-circuit is connected to an inter-frame reset control end, a reset signal end and a first to-be-reset node, respectively, and the first reset sub-circuit is configured to write a reset signal of the reset signal end into the first to-be-reset node according to an inter-frame reset control signal of the inter-frame reset control end;

wherein the inter-frame reset control end is connected to an inter-frame reset control line, and inter-frame reset control ends of the plurality of gate driving circuits are connected to a same inter-frame reset control line;

wherein the display substrate further comprises: a pixel circuit and a light emitting device, the pixel circuit is configured to drive the light emitting device to emit light;

wherein the plurality of gate driving circuits comprise at least one of:

a first gate driving circuit connected to a writing control end of the pixel circuit and configured to provide a writing control signal to the pixel circuit;

a second gate driving circuit connected to a compensating control end of the pixel circuit and configured to provide a compensating control signal to the pixel circuit; and a third gate driving circuit connected to an initialization control end of the pixel circuit and configured to provide an initialization control signal to the pixel circuit;

wherein each of the shift registers in the first gate driving circuit further comprises a second reset sub-circuit, the second reset sub-circuit is connected to an inter-line reset control end, the reset signal end and a second to-be-reset node, respectively, and the second reset sub-circuit is configured to write the reset signal of the reset signal end into the second to-be-reset node according to an inter-line reset control signal of the inter-line reset control end; and wherein the inter-frame reset control line is further connected to the inter-line reset control end of a last level shift register in the first gate driving circuit.

2. The display substrate according to claim 1, wherein the inter-frame reset control line connecting the plurality of gate driving circuits is connected to a same signal input terminal.

3. The display substrate according to claim 1, wherein the inter-frame reset control line comprises: a first extending line, a second extending line and a leading line, the first extending line is intersected with the second extending line, and the first extending line and the second extending line are connected to each other at an intersection position, one end of the leading line is connected to the second extending line, and the other end of the leading line is connected to the inter-frame reset control end.

4. The display substrate according to claim 3, wherein the inter-frame reset control line comprises: two first extending lines, in an arranging direction of the plurality of shift registers located in a same gate driving circuit, one of the two first extending lines is located at one side of the plurality of gate driving circuits close to a signal input terminal, and the other is located at one side of the plurality of gate driving circuits away from the signal input terminal, wherein the signal input terminal is connected to the inter-frame reset control line.

5. The display substrate according to claim 3, wherein the first extending line and the second extending line are arranged in different layers, and are connected through a via hole at the intersection position.

6. The display substrate according to claim 3, wherein the display substrate further comprises a first signal line, and the first signal line and the first extending line are arranged at different layers and are intersected with each other at a first position;

wherein at least one strip hole is disposed in the first extending line of the first position, and the at least one strip hole is configured to divide the first extending line of the first position into a plurality of extending segments that are connected in parallel with each other, extending directions of the extending segments are intersected with an extending direction of the first signal line.

7. The display substrate according to claim 6, wherein the extending directions of the extending segments are the same as the extending direction of the first extending line.

8. The display substrate according to claim 7, wherein in the extending direction of the first extending line, sizes of the extending segments are greater than a size of the first signal line.

9. The display substrate according to claim 3, wherein an extending direction of the first extending line is the same as an arranging direction of the plurality of gate driving circuits, and an extending direction of the second extending line is the same as an arranging direction of the plurality of shift registers located within a same gate driving circuit.

10. The display substrate according to claim 3, wherein the display substrate comprises an active area and a border frame area located at at least one side of the active area, the inter-frame reset control line and the plurality of gate driving circuits are located in the border frame area; and the plurality of shift registers located within a same gate driving circuit are connected to a same second extending line through a plurality of leading lines, and the same second extending line is located at one side of the plurality of leading lines away from the active area.

11. The display substrate according to claim 1, wherein the display substrate comprises a plurality of pixel circuits arranged in an array, and the plurality of pixel circuits form a plurality of pixel circuit rows;

wherein one shift register in the first gate driving circuit is connected to one of the pixel circuit rows, and one shift register in the second gate driving circuit is connected to one or more pixel circuit rows, and one shift register in the third gate driving circuit is connected to the one or more pixel circuit rows.

12. The display substrate according to claim 11, wherein the one shift register in the second gate driving circuit is connected to multiple pixel circuit rows, and the multiple pixel circuit rows are connected to different outputting transistors in the one shift register in the second gate driving circuit, gate electrodes of the outputting transistors connected to the multiple pixel circuit rows are connected to a same node; and the one shift register in the third gate driving circuit is connected to the multiple pixel circuit rows, and the multiple pixel circuit rows are connected to different outputting transistors in the one shift register in the third gate driving circuit, the gate electrodes of the outputting transistors connected to the multiple pixel circuit rows are connected to a same node.

13. The display substrate according to claim 1, wherein the pixel circuit comprises:

a writing sub-circuit connected to the writing control end, a data end and a first node, and configured to write a data signal of the data end into the first node according to the writing control signal;

a compensating sub-circuit connected to the compensating control end, a reference voltage end and the first node, and configured to write a voltage of the reference voltage end into the first node according to the compensating control signal;

an initialization sub-circuit connected to the initialization control end, an initialization voltage end and a second node, and configured to write a voltage of the initialization voltage end into the second node according to the initialization control signal, wherein the second node is further connected to a first pole of the light emitting device;

a storage capacitor, wherein a first pole of the storage capacitor is connected to the first node, and a second pole of the storage capacitor is connected to the second node;

a driving sub-circuit connected to the first node, the second node and a third node, and configured to write a signal of the third node into the second node under potential control of the first node; and a light emitting sub-circuit connected to a light emitting control end, a first voltage end and the third node, and configured to cooperate with the driving sub-circuit according to a light emitting control signal of the light emitting control end to drive the light emitting device to emit the light.

14. A display device, comprising:

the display substrate according to claim 1; and a driving chip connected to the display substrate and configured to provide a driving signal to the display substrate.

15. A method for driving the display substrate, configured to drive the display substrate according to claim 1, the method comprising:

between two frame periods, providing the inter-frame reset control signal to the inter-frame reset control line, so that the inter-frame reset control signal is input into the inter-frame reset control end through the inter-frame reset control line, the first reset sub-circuit writes the reset signal of the reset signal end into the first to-be-reset node according to the inter-frame reset control signal.

* * * * *